United States Patent Office 3,767,615
Patented Oct. 23, 1973

3,767,615
STABILIZATION OF HALOGEN CONTAINING POLYMERS
Peter E. Throckmorton and William J. McKillip, Worthington, Ohio, and Harvey J. Richards, Savage, Minn., assignors to Ashland Oil, Inc., Columbus, Ohio
No Drawing. Filed Feb. 28, 1972, Ser. No. 227,653
Int. Cl. C08f 45/56, 45/62; C08g 45/56, 45/62
U.S. Cl. 260—45.75 R                    13 Claims

ABSTRACT OF THE DISCLOSURE

Compositions comprising halogen containing polymers and at least one organic compound in an effective stabilizing amount having structural formula selected from the group of:

(1)
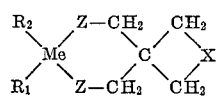

and (2)
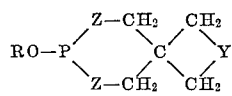

wherein Me is a Group IV-A metal; X is O, S, or $CH_2$; Y is S or $CH_2$; each Z individually is O or S; and each R, $R_1$, and $R_2$ individually is alkyl, aryl, cycloalkyl, aralkyl, or alkaryl. Also, the organic compounds and their method of preparation are provided.

BACKGROUND OF THE INVENTION

The present invention is concerned with the stabilization of halogen containing polymers and compounds suitable therefor. More particularly the present invention is concerned with the stabilization of halogen containing polymers with certain spiro organic compounds, and the compounds per se.

Halogen containing polymers such as polyvinyl chloride are susceptible to degradation by oxidation, and eventually may become useless for their intended purpose. The chemical reaction by means of which oxygen attacks and degrades halogen containing polymers is a free radical chain reaction. Free radicals are produced by abstraction of hydrogen atoms from the molecules of the compounds by light, heat, mechanical action, active molecules, and the like.

The free radicals are extremely reactive in the presence of air and oxygen, forming peroxide radicals, which, in turn, abstract hydrogen atoms from the molecule to form additional radicals. These again react with oxygen in some manner. Thus, once started, the reaction is a self-perpetuating, degradative, continuous, chain reaction until stopped. In order to prevent such degradation, various stabilizers have been added which react with and destroy the intermediate chemical-free radicals, as they form, without producing equally reactive intermediates.

In addition, the degradation of halogen containing polymers is further complicated by the susceptibility of the polymer to dehydrohalogenation to olefins caused by heat which may be present for instance during hot milling of the polymer. These olefin materials in turn are extremely susceptible to the above-discussed oxidation which rapidly results in highly discolored materials of reduced physical properties.

Various compounds have previously been employed as stabilizers for such halogen containing polymers; however, many of these prior stabilizers have not provided polymer compositions with the desired degree of resistance to such outdoor environmental effects as ultraviolet light. Continuing work is therefore being done to obtain compounds with improved stabilization properties.

It has been found according to the present invention that certain spiro organic compounds possess increased stabilizing properties; and particularly increased stabilizing properties when exposed to outdoor conditions and direct sunlight.

SUMMARY OF THE INVENTION

The polymer composition aspect of the present invention comprises a halogen containing polymer and an effective stabilizing amount of at least one organic compound represented by one of the following structural formulas:

(1)
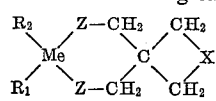

and (2)
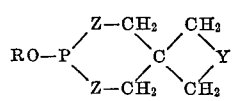

wherein Me is a Group IV-A metal; X is O, S, or $CH_2$; Y is S or $CH_2$; each Z individually is either O or S; each R, $R_1$, and $R_2$ individually is an alkyl group containing from 1 to about 22 carbon atoms, or an aryl group containing from 6 to about 14 carbon atoms, or a cycloalkyl group containing from about 3 to about 12 carbon atoms, or an aralkyl group containing from 7 to about 18 carbon atoms, or an alkaryl group containing from 7 to about 18 carbon atoms.

The compounds having the structural Formula 1 can be prepared by reacting a metallic compound of the formula:

(3)

and a dihydric compound of the formula:

(4)
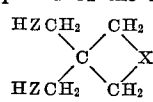

The compounds having the structural Formula 2 can be prepared by reacting a phosphite of the formula:

(5)             $P(OR)_3$ and a dihydric compound of the formula:

(6)
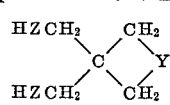

Description of the preferred embodiments

The stabilizers employed in the present invention are represented by the following structural formulas:

(1)
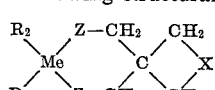

and (2)
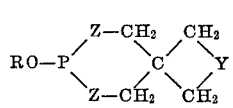

wherein Me represents a Group IV-A metal such as Sn, Pd, or Ge, and preferably is Sn.

Each Z individually is either O or S, and preferably at least one Z in each formula is O. It is most preferred that both Z's of each formula are O.

X of Formula 1 is either O or S or $CH_2$ and preferably is S.

Y of Formula 2 is either S or $CH_2$ and preferably is S.

Each R, $R_1$, and $R_2$ individually is either an alkyl group having from 1 to about 22 carbon atoms, or a cycloalkyl group having from about 3 to about 12 carbon atoms, or an aryl group having 6 to about 14 carbon atoms, or alkaryl group having from 7 to about 18 carbon atoms, or an aralkyl group having from 7 to about 18 carbon atoms.

Some examples of suitable alkyl groups include methyl, ethyl, n-butyl, t-butyl, t-amyl, hexyl, 2-ethyl hexyl, nonyl, and octadecyl. The preferred alkyl group contains from 1 to about 12 carbon atoms of which n-butyl is the most preferred.

Some suitable cycloalkyl radicals include cyclopropyl, cyclopentyl, cyclobutyl, cyclohexyl, cycloheptyl, cyclooctyl, and cyclododecyl.

Examples of some suitable aryl radicals include phenyl, naphthyl, phenanthryl, and anthracyl.

Examples of some suitable alkaryl radicals include tolyl, xylyl, and cumyl. Examples of some suitable aralkyl radicals include phenylmethyl and naphthylethyl. Usually, but not necessarily, both $R_1$ and $R_2$ are the same in Formula 1.

Some preferred compounds represented by Formula 1 include 3,3-di-n-butyl-3-stanna-2,4-dithia-spiro[5·3]-nonane;
3,3-di-n-butyl-3-stanna-2,4-dioxa-spiro[5·3]-nonane;
3,3-di-n-butyl-3-stanna-2-oxa-4-thia-spiro[5·3]-nonane;
3,3-di-n-butyl-3-stanna-2,4,8-trithia-spiro[5·3]-nonane;
3,3-di-n-butyl-3-stanna-2,4-dioxa-8-thia-spiro[5·3]-nonane;
3,3-di-n-butyl-3-stanna-2-oxa-4,8-dithia-spiro[5·3]-nonane;
3,3-di-n-butyl-3-stanna-2,4-dithia-8-oxa-spiro[5·3]-nonane;
3,3-di-n-butyl-3-stanna-2-oxa-4-thia-8-oxa-spiro[5·3]-nonane;
3,3-di-n-octyl-3-stanna-2,4-dithia-spiro[5·3]-nonane;
3,3-di-n-octyl-3-stanna-2-oxa-4-thia-spiro[5·3]-nonane;
3,3-di-n-octyl-3-stanna-2,4,8-trithia-spiro[5·3]-nonane;
3,3-di-n-octyl-3-stanna-2-oxa-4,8-dithia-spiro[5·3]-nonane;
3,3-di-methyl-3-plumba-2,4-dithia-spiro[5·3]-nonane; and
3,3-di-n-butyl-3-germana-2,4,8-trithia-spiro[5·3]-nonane.

Some suitable compounds corresponding to Formula 2 include 3-n-butoxy-3-phospha-2,4,8-trithia-spiro[5·3]-nonane;
3-n-butoxy-3-phospha-2-oxa-4,8-dithia-spiro[5·3]-nonane;
3-n-butoxy-3-phospha-2,4-dioxa-8-thia-spiro[5·3]-nonane;
3-phenoxy-3-phospha-2,4,8-trithia-spiro[5·3]-nonane; and
3-phenoxy-3-phospha-2-oxa-4,8-dithia-spiro[5·3]-nonane.

Compounds corresponding to Formula 1 can be prepared by reacting (1) a metal compound of the formula:

and (2) a dihydric compound of the formula:

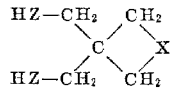

under condensation conditions. $R_1$, $R_2$, Me, Z, and X have the same meaning as defined hereinabove. The metal compound and the dihydric compound are preferably reacted in stoichiometric amounts. However, excess quantities of either reactant can be employed and in some cases may be advantageous according to the reaction kinetics.

The condensation reaction is carried out in a suitable reaction diluent. The diluent could be any organic liquid provided it is inert (not reactive in any manner which will harm the reaction or product) and will dissolve or suspend the reactants. Examples of suitable diluents include aromatic hydrocarbons such as benzene, toluene, xylene, and tetrahydrofuran. The minimum amount of diluent when employed is usually between about 4 parts by weight per part of reactants. The maximum amount of diluent is only limited by practical considerations such as economics and equipment capacities. Preferably the amounts of diluent is between about 4 parts and about 10 parts per part of reactant.

The process can be carried out over a wide range of temperatures. For example, a process can be carried out at temperatures from about 70 to about 130° C. The preferred temperature range varies from about 80° C. to about 90° C., and the most preferred temperature is about 85° C. It is preferred that the reaction is carried out under reflux. It is convenient to azeotropically remove the water of condensation. The time necessary to effect substantial completion of the reaction will vary, primarily dependent upon the particular reactants, temperatures, and the reaction environment. Preferably the reaction time varies from about 2 to about 8 hours. About 3 hours is the reaction time which is most commonly used. Advantageously, the reaction is carried out under atmospheric pressure. Of course, higher or lower pressures can be employed when desired. The desired product can be separated from the reaction mass by cooling to room temperature in order to effect precipitation of the desired product. The precipitated product can be removed from the reaction mass by filtration and possible drying. Of course, for extremely pure products, it may be desirable to employ one or more washing steps.

Included among the suitable metal compounds that can be used as the reactants in preparing compounds according to Formula 1 are di-n-butyl-stannic oxide; di-n-octyl-stannic oxide; dimethyl-stannic oxide; methyl, n-butyl-stannic oxide; dimethyl lead oxide; di-n-butyl germanium oxide; dimethyl germanium oxide; diphenyl stannic oxide; dicyclohexyl stannic oxide; ditolyl stannic oxide; and phenyl-n-butyl stannic oxide.

Included among the suitable dihydric compounds which can be employed in the above-described process for preparing the materials of Formula 1 and Formula 2 are 1,1-bis(hydroxymethyl)-cyclobutane; 1,1-bis - (mercaptomethyl)-cyclobutane; 3,3-bis-(hydroxymethyl) - thietane; 3,3-bis-(mercaptomethyl)-thietane; 3,3 - bis - (hydroxymethyl)-oxetane; and 3,3-bis-(mercaptomethyl)-oxetane.

The compounds corresponding to Formula 2 can be prepared by reacting a phosphite of the formula:

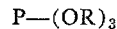

and a dihydric compound of the formula:

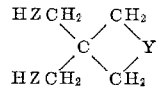

under condensation conditions.

R, Z, and Y have the same meanings as defined hereinabove. Examples of dihydric compounds for preparing the compounds of Formula 2 include 1,1-bis-(hydroxymethyl)-cyclobutane; 3,3-bis-(hydroxymethyl) - thietane; and 3,3-bis-(mercaptomethyl)-thietane.

Some examples of phosphites suitable for preparing the compounds represented by Formula 2 include triphenyl phosphite; tridecyl phosphite; tri-p-tolyl phosphite; tribenzyl phosphite; trimethyl phosphite; and tricyclohexyl phosphite.

Generally about 1 mole of the dihydric compound is employed per mole of phosphite in preparing the compounds of Formula 2. The reaction is generally carried out in the presence of an alkaline catalyst such as 0.01 to 1% of sodium phenolate, sodium methylate, sodium decylate, sodium cresylate, sodium hydroxide, sodium metal and alcohol, potassium phenolate, etc. The phenol or alkanol which may be formed during the reaction can be removed by vacuum distillation.

The types and amounts of diluent, reaction temperatures, and times as discussed above for preparing compounds of Formula 1 are applicable for preparing compounds of Formula 2.

Methods for preparing various of the polyhydric compounds employed in preparing the compounds represented by Formulas 1 and 2 are known. For example, the methods for preparing 1,1-bis-(hydroxymethyl)-cyclobutane; 3,3-bis-(hydroxymethyl)-thietane; and 3,3-bis-(hydroxymethyl)-oxetane are set forth in Journal Elastoplastics, Volume 2, July 1970, Polyurethane Plastics Containing Pendant Heterocyclic Groups, Throckmorton et al., pages 153–164, disclosure of which is incorporated herein by reference. In addition, a suggested method for preparing 3,3-bis-(mercaptomethyl)-oxetane involves the condensation of dithiopentaerythritol with phosgene to form bis-(mercaptomethyl)-cyclic carbonate. The cyclic carbonate is then heated to effect pyrolysis and elimination of $CO_2$ whereby 3,3-bis-(mercaptomethyl)-oxetane is formed. A suggested method for forming 3,3-bis-(mercaptomethyl)-thietane is the treatment of 3,3-bis-(mercaptomethyl)-oxethane with elemental sulfur causing the oxetane ring to open, substitution of the oxygen with the sulfur, and the subsequent closing of the ring to form the thietane. An example of a suggested method for forming 1,1-bis-(mercaptomethyl)-cyclobutane involves reacting 1,1-bis-(hydroxymethyl)-cyclobutane with HCl to obtain 1,1-bis-(chloromethyl)-cyclobutane. The 1,1-bis-(chloromethyl)-cyclobutane is then treated with potassium thiocetate to form the thioester which in turn is hydrolyzed to 1,1-bis-(mercaptomethyl)-cyclobutane.

The compounds of the present invention are particularly valuable as stabilizers for halogen containing polymers. They can be used in an amount of about 0.01 to 5% and preferably about 0.1 to 2% by weight of the polymer.

The compounds of the present invention can be employed with halogen containing vinyl and vinylidene polymers in which the halogen is attached directly to a carbon atom. Preferably, the polymer is a vinyl halide polymer, and most preferably a vinyl chloride polymer. Generally, the vinyl chloride polymer is obtained from monomers consisting of vinyl chloride alone or a mixture of monomers containing at least about 70% vinyl chloride by weight. When vinyl chloride copolymers are stabilized, preferably the copolymer of vinyl chloride with an ethylenically unsaturated compound copolymerized therewith contains at least about 10% of polymerized vinyl chloride.

Moreover, as the halogenated polymer there can be employed halogenated polyethylene having 14 to 75% halogen or preferably chlorine by weight, polyvinyl chloride, polyvinylidene chloride, polyvinyl bromide, polyvinyl fluoride, polyvinylidene fluoride, polytetrafluoroethylene, copolymers of vinyl chloride with 1 to 90%, preferably 1 to 30% of a copolymerizable ethylenically unsaturated material such as vinyl acetate, vinyl butyrate, vinyl benzoate, vinylidene chloride, diethyl fumarate, dietyhl maleate, other alkyl fumarates and maleates, vinyl propionate, methyl acrylate, 2-ethyl hexyl acrylate, butyl acrylate, and other alkyl acrylates, methyl methacrylate, ethyl methacrylate, butyl methacrylate, and other alkyl methacrylates, methyl alphachloroacrylate, styrene, trichloroethylene, vinyl ethers such as vinyl ethyl ether, vinyl chloroethyl ether, and vinyl phenyl ether, vinyl ketones such as vinyl methyl ketone, and vinyl phenyl ketone, 1-fluoro-1-chloroethylene, acrylonitrile, chloroacylonitrile, allylidene diacetate, and chloroallyidene diacetate. Typical copolymers include vinyl chloride-vinyl acetate (96:4 commercially available as VYNW), vinyl chloride-vinyl acetate (87:13), vinyl chloride-vinyl acetate-maleic anhydride (86:13:1), vinyl chloride and vinylidene chloride (95:5), vinyl chloride-diethyl fumarate (95:5), vinyl chloride-trichloroethylene (95:5), vinyl chloride-2-ethyl hexyl acrylate (80:20).

The compounds of Formula 1 are particularly suitable for stabilization of unplasticized rigid vinyl halide polymers such as rigid polyvinylchloride. The compounds of Formula 2 are most suitable as auxiliary stabilizers in plasticized or flexible vinyl halide polymer compositions in combination with metal containing stabilizers. In addition, both the compounds of Formula 1 and of Formula 2 can be employed in admixture with other suitable prior art stabilizers, or can be used in admixture with each other.

The compounds of the present invention can be incorporated with the polymer by admixing in an appropriate mill or mixer or by any other of the well known methods which provide for uniform distribution throughout the polymer composition. Thus, mixing can be accomplished by milling on rolls at 100 to 160° C. In addition to the stabilizers employed in the present invention, there can also be incorporated with the polymer conventional additives such as plasticizers, pigments, fillers, dyes, ultraviolet light absorbing agents, densifying agents, and the like. If a plasticizer is employed, it is used in conventional amounts, e.g., 30 to 150 parts per 100 parts polymer. Typical plasticizers are di-(2-ethylhexyl)-phthalate, dibutyl sebacate, dioctyl sebacate, and tricresyl phosphate. Conventional additives such as barium and cadmium laurate can also be employed.

To further understand the present invention, the following non-limiting examples, wherein all parts are by weight unless the contrary is stated, are given:

EXAMPLE A

Preparation of 3,3-di-n-butyl-3-stanna-2,4-dioxa-spiro[5·3]-nonane

Into a reaction vessel equipped with a stirrer, a Dean-Stark trap, and a reflux condenser are added 19.9 parts of 1,1-bis-(hydroxymethyl)-cyclobutane and 42.6 parts of dibutyl tin oxide (DBTO). 440 parts of hot anhydrous benzene are then added forming a solution of the cyclobutane compound and by stirring suspending the DBTO. The stirred suspension is then refluxed for 3 hours during which time 3 parts of water are removed by azeotropic distillation and collected in the trap. At this time, the reaction medium is cooled to room temperature and 22.65 parts of a product in the form of fine white needles having a melting point of from 135 to 137° C. are precipitated out of the suspension and are recovered. The mother liquor is then heated to 60° C. under 25 mm. vacuum to effect concentration by evaporation of the benzene and an additional 15.5 parts of a less pure product having a melting point of from 129 to 136° C. are obtained. The combined product accounts for a total yield of about 64%. The product obtained is 3,3-di-n-butyl-3-stanna-2,4-dioxa-spiro[5·3]-nonane as determined by elemental analysis and freedom from hydroxyl content as shown by infrared spectra. Thus, the product corresponds to the following formula:

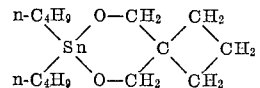

The elemental analysis is reproduced below:
Calcd. (percent): C, 48.4; H, 8.13; Sn, 34.2. Found (percent): C, 48.11; H, 8.10; Sn, 35.67.

EXAMPLE B

Preparation of 3,3 - di-n-butyl-3-stanna-2,4-dithia-spiro-[5·3]-nonane and 3,3-di-n-butyl-3-stanna-2-oxa-4-thia-spiro-[5·3]-nonane Example A is repeated except that the 1,1-bis-(hydroxymethyl)-cyclobutane is replaced with 25.3 parts of 1,1-bis-(mercaptomethyl)-cyclobutane. The results are similar except that the product is a mixture of 3,3-di-n-butyl-3-stanna - 2,4 - dithia-spiro - [5·3]-nonane and 3,3-di-n-butyl-3 - stanna - 2 - oxa - 4 - thia-spiro-[5·3]-nonane and corresponds to the following formulas:

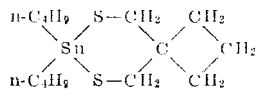

and

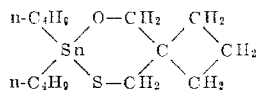

EXAMPLE C

Preparation of 3,3-di-n-butyl-3-stanna-2,4-dioxa-8-thia-spiro[5·3]-nonane

In a reaction vessel equipped with a stirrer, a Dean-Stark trap and a reflux condenser are added 74.8 parts of dibutyl tin oxide and 4.2 parts of 3,3-bis-(hydroxymethyl)-thietane. 264 parts of anhydrous benzene are then added forming a suspension of the reactants. The suspension is stirred and refluxed for about 4 hours at which time the reaction is completed and 5.4 parts of water are removed. The reaction medium is cooled to room temperature whereupon a crystalline product precipitates out. 88 parts of this product are removed from the reaction medium by filtration and are then dried. The product has a melting point of 180 to 182° C. The mother liquor from the reaction mass is evaporated whereby an additional 17 parts of crystalline product are obtained resulting in a total yield of 95.2%. The product is 3,3-di-n-butyl-2,4-dioxa - 3 - stanna - 8 - thia-spiro[5·3]-nonane as determined by elemental analysis and freedom from hydroxyl and the presence of thietane by infrared spectra showing strong absorption at wavelength of 8.45 microns. The product corresponds to the following formula:

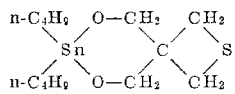

The results of the elemental analysis are reproduced below:

Calcd. (percent): C, 42.7; H, 7.18; S, 8.77; Sn, 32.5. Found (percent): C, 42.94; H, 7.00; S, 7.63; Sn, 36.5.

EXAMPLE D

Preparation of 3,3-di-n-butyl-3-stanna-2,4,8-trioxa-spiro[5·3]-nonane

In a reaction vessel equipped with a stirrer, a Dean-Stark trap, and a reflux condenser are added 58.2 parts of 3,3-bis-(hydroxymethyl)-oxetane and 122.5 parts of dibutyl tin oxide. 440 parts of anhydrous benzene are then added forming a suspension of the reactants. The suspension is then refluxed for 5 hours at which time the reaction is completed whereby 8.5 parts of water have been removed from the reaction mass. At this time a clear solution results which upon cooling to room temperature deposits the desired product in the form of a crystalline precipitate. 33.5 parts of the product are then removed from the reaction mass by filtration and are then dried. The product has a melting point of 181 to 184° C. In addition, the mother liquor is evaporated whereby 90 more parts of a less pure product having a melting point of 150 to 164° C. are obtained. This results in a total combined product yield of about 71.6%. The product obtained is 3,3-di-n-butyl-3-stanna-2,4,8-trioxaspiro[5·3]-nonane as determined by elemental analysis and freedom from hydroxyl and the presence of oxetane by infrared spectra showing strong absorption at wavelength of 10.3 microns. The product corresponds to the following formula:

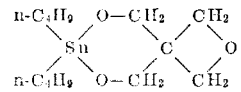

The results from the elemental analysis are reproduced below:

Calcd. (percent): C, 44.7; H, 7.52; Sn, 34.0. Found (percent): C, 44.95; H, 7.41; Sn, 33.82.

EXAMPLE E

Preparation of 3,3 - di-n-butyl-3-stanna-2,8-dioxa-4-thia-spiro - [5·3] - nonane and 3,3-di-n-butyl-3-stanna-2,4-dithia-8-oxa-spiro-[5·3]-nonane Example D is repeated except that the 3,3-bis-(hydroxymethyl)-oxetane is replaced with 72.8 parts of 3,3-bis-(mercaptomethyl)-oxetane. The results are similar to those of Example D except that the product is a mixture of 3,3 - di - n-butyl-3-stanna-2,8-dioxa-4-thia-spiro-[5·3]-nonane and 3,3-di-n-butyl-3-stanna-2,4-dithia-8-oxa-spiro-[5·3]-nonane and are represented by the following formulas:

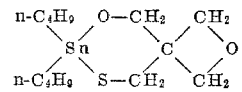

and

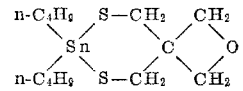

EXAMPLE F

Preparation of 3,3-di-n-octyl-3-stanna-2,4,8-trioxa-spiro[5·3]-nonane

In a reaction vessel equipped with a stirrer, a Dean-Stark trap, and a reflux condenser are added 10.9 parts of 3,3-bis-(hydroxymethyl)-oxetane and 30.9 parts of di-n-octyl tin oxide. 308 parts of anhydrous benzene are then added forming a suspension of the reactants. The suspension is then refluxed for about 6½ hours at which time the reaction is completed whereby about 1 part of water has been removed from the reaction mass. At this time a clear solution results which upon cooling to room temperautre deposits the desired product in the form of a white crystalline precipitate. 9.5 parts of the product are then removed from the reaction mass by filtration and are then dried. The product has a melting point of 140 to 144° C. In addition, the mother liquor upon standing at room temperature deposits 5 more parts of a less pure product in the form of a crystalline precipitate having a melting point of 115 to 120° C. The product is removed from the reaction mass by filtration and is then dried. Upon further standing at room temperature, the mother liquor deposits additional product in the form of a crystalline precipitate. 17 parts of this product are removed from the reaction mass by filtration and are then dried. This product has a melting point of 104 to 105° C. This results in a total combined product yield of about 80%. The product obtained is 3,3-di-n-octyl-3-stanna-2,4,8-trioxa-spiro-[5·3]-nonane as determined by elemental analysis and freedom from hydroxyl and the presence of oxetane by infrared spectra showing strong absorption at wavelengths of 10.3 mirons, and gel permeation chromatography which shows a chromagram of 15.7 A. The product corresponds to the following formula:

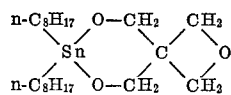

The results from the elemental analysis are reproduced below:
Calcd. (percent): C, 54.7; H, 9.18; Sn, 25.8. Found (percent): C, 58.82; H, 9.34; Sn, 20.69.

EXAMPLE G

Preparation of 3-butoxy-3-phospha-2,4-dioxa-8-thia-spiro-[5·3]-nonane

To 13.4 parts of 3,3-bis-(hydroxymethyl)-thietane in 440 parts of anhydrous benzene are added 25 parts of freshly distilled tributyl phosphite having a boiling point of 122° at 12 mm. of Hg, and 0.5 part of triethyl amine catalyst. The solution is heated at reflux for 4 hours and the benzene removed in a rotary flash evaporator. The residue is then slowly distilled by heating at 120° C. under 15 mm. of vacuum. There is obtained 11.4 parts of butyl alcohol and a residual crude product amounting to 15.4 parts. The crude product is then distilled yielding 13.1 parts (55.5% yield) of a product boiling at 105° (0.2 mm.). The product is 3-n-butoxy-3-phospha-2,4-dioxa-8-thia-spiro-[5·3]-nonane as determined by elemental analysis and freedom from hydroxyl and the presence of thietane by infrared spectro. The product corresponds to the following formula:

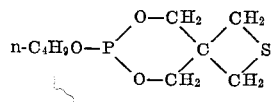

The results from the elemental analysis are reproduced below:
Calcd. (percent): C, 45.7; H, 7.20; S, 13.55; P, 12.71. Found (percent): C, 45.43; H, 7.35; S, 13.50; P, 13.03.

EXAMPLE H

Preparation of 3-butoxy-3-phospha-2,4-dithia-spiro-[5·3]-nonane

Example G is repeated except that the 3,3-bis-(hydroxymethyl)-thietane is replaced with 14.8 parts of 1,1-bis-(mercaptomethyl)-cyclobutane. The results are similar to those of Example G except that the product is 3-butoxy-3-phospha-2,4-dithia-spiro-[5·3]-nonane and corresponds to the following formula:

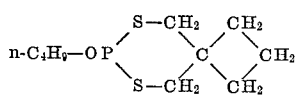

The following examples illustrate the stabilization properties of the materials of this invention.

EXAMPLE 1

100 parts by weight of a polyvinyl chloride commercially available under the trade designation Geon 103 EPF-7 are dry-mixed with 10 parts of a copolymer of acrylonitrile, styrene and butadiene commercially available under the trade designation Blendex 401, 1 part by weight of magnesium stearate, and 2 parts of 3,3-di-n-butyl-3-stanna-2,4-dioxa-spiro-[5·3]-nonane. The composition is heated to 330° C. and milled to provide sheets measuring ¾ inch by 8 inches by 0.015–0.020 inch. The sheets are then aged at 375° F. and the color change vs. time recorded. The following is a tabulation of the results of the test at 375° F.

| Time (min.): | Description |
|---|---|
| Initial (0) | Clear white. |
| 15 | Yellow. |
| 30 | Orange. |
| 45 | Dark orange. |
| 60 | Brown. |
| 75 | Dark brown. |

EXAMPLE 2

100 parts by weight of a polyvinyl chloride commercially available under the trade designation Geon 102 EPF-1 are admixed with 50 parts by weight di-(2-ethylhexyl) phthalate, 2 parts by weight of a commercially available barium-cadmium soap available under the trade designation Ferro 1820, and 0.5 part by weight of 3-butoxy - 3 - phospha - 8 - thia - 2,4 - dioxa-spiro-[5·3]-nonane. Test samples are obtained from this composition as set forth above in Example 1. The results of the tests are set forth below:

| Time (min.): | Description |
|---|---|
| Initial (0) | Clear water white. |
| 45 | Clear white. |
| 60 | Slightly yellow. |
| 75 | Yellow. |
| 90 | Dark brown. |

The composition is also milled to provide sheets measuring 3 inches by 8 inches by 0.015 inch. These sheets are placed on outdoor exposure racks and tested for tensile strength, percent elongation to break (ASTM Method D–412 61T). The specimens are observed for development of discoloration as brown spots, which is typical of failure of PVC under light and atmospheric exposure. The results of the outdoor test of this example are reproduced below:

| Time (months) | Tensile (p.s.i.) | Elongation (percent) | Appearance |
|---|---|---|---|
| Initial (0) | 3,375 | 305 | Clear white. |
| 1 | 3,084 | 244 | Do. |
| 3 | 3,484 | 290 | Do. |
| 6 | 2,473 | 183 | Very slightly brown spots. |
| 9 | 1,967 | 96 | Some brown spots. |
| 12 | 1,891 | 91 | Many brown spots. |

As noted in the tabulation above, the samples after a 12 month outdoor exposure are moderately covered with the typical brown spots that polyvinyl chloride develops in such tests. Until 6 months outdoor exposure, the composition is unchanged with respect to discoloration. Considerable strength and elasticity (elong.) are retained after the 12 months exposure.

EXAMPLE 3

Example 2 is repeated except that the 0.5 part by weight of 3 - butoxy - 3-phospha-8-thia-2,4-dioxa-spiro-[5·3]-nonane are replaced with 0.5 part by weight of an alkyl, aryl phosphite auxiliary stabilizer of the type available as Ferro 8VI. The results of this test are reproduced below:

| Time (months) | Tensile (p.s.i.) | Elongation (percent) | Appearance |
|---|---|---|---|
| Initial (0) | 3,610 | 300 | Clear white. |
| 1 | 3,518 | 311 | Do. |
| 3 | 3,170 | 269 | Do. |
| 6 | 2,147 | 130 | Some brown spots. |
| 9 | 1,600 | 78 | Many brown spots. |
| 12 | 980 | 42 | Heavy dark brown spots. |

After 6 months of outdoor exposure, the compositions contain some brown spots, and after 12 months of exposure demonstrate a great amount of very heavy, dark brown spots. Some strength and elasticity (elong.) is retained after 12 months but to a far lesser degree than Example 2 preceding.

EXAMPLE 4

Example 1 is repeated except that the two parts of 3,3-di - n - butyl - 3 - stanna-2,4-dioxa-spiro-[5·3]-nonane are replaced by 2 parts by weight of 3,3-di-n-butyl-3-stanna - 2,4 - dioxa - 8 - thia-spiro-[5·3]-nonane. The results obtained on aging at 375° are improved compared to those obtained in Example 1.

| Time (min.): | Description |
|---|---|
| Initial (0) | Clear white. |
| 15 | Light yellow. |
| 30 | Orange. |
| 45 | Yellow. |
| 60 | Dark orange. |
| 75 | Brown. |
| 90 | Dark brown. |

Specimens are milled for outdoor exposure test according to the specification of Example 2. The results are reproduced below.

| Time (months): | Description |
|---|---|
| Initial (0) | Clear. |
| 1 | Very slightly yellow. |
| 3 | Slightly yellow. |
| 6 | Slightly yellow, opaque. |
| 9 | Slightly yellow, opaque brittle. |
| 12 | Yellow, opaque, very brittle. |

What is claimed is:

1. Composition comprising halogen-containing polymer and at least one organic compound having the structural formula (I) 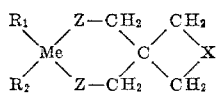

in an effective stabilizing amount, wherein Me is a Group IV–A metal; X is selected from the group of O, and S each Z individually is selected from the group of O and S; each R, $R_1$, and $R_2$ is individually selected from the group consisting of alky radicas having 1 to about 22 carbon atoms, cycloalkyl radicals having from about 3 to about 12 carbon atoms, aryl radicals having 6 to about 14 carbon atoms, alkaryl radicals having from 7 to about 18 carbon atoms, and aralkyl radicals having from 7 to about 18 carbon atoms.

2. The composition of claim 1 wherein Z is O.
3. The composition of claim 1 wherein X is S.
4. The composition of claim 1 wherein said halogen-containing polymer is a vinyl chloride polymer.
5. The composition of claim 1 wherein said organic compound is present in an amount of between about 0.01 and about 5% by weight based upon the halogen-containing polymer.
6. The composition of claim 1 wherein said organic compound is 3,3 - di - n-butyl-3-stanna-2,4-dioxa-8-thia-spiro-[5·3]-nonane.
7. The composition of claim 1 wherein said organic compound is 3,3 - di-n-butyl-3-stanna-2,4,8-trithia-spiro-[5·3]-nonane.
8. The composition of claim 1 wherein said organic compound is 3,3 - di-n-butyl-3-stanna-2,4,8-trioxa-spiro-[5·3]-nonane.
9. The composition of claim 1 wherein Me is tin.
10. The composition of claim 9 wherein Z is O.
11. The composition of claim 9 wherein X is S.
12. The composition of claim 1 wherein said halogen-containing polymer is a vinyl chloride polymer containing at least about 70 percent by weight of vinyl chloride.
13. The composition of claim 1 wherein X is O.

References Cited

UNITED STATES PATENTS

| | | | |
|---|---|---|---|
| 2,789,994 | 4/1957 | Ramsden et al. | 260—45.75 |
| 2,885,415 | 5/1959 | Ramsden | 260—45.75 |
| 3,264,256 | 8/1966 | Mack | 260—45.75 |
| 3,415,749 | 12/1968 | Bridger | 260—45.75 |
| 3,665,025 | 5/1972 | Wowk | 260—45.75 |
| 3,356,630 | 12/1967 | Vona et al. | 260—30.4 |
| 2,891,837 | 6/1959 | Campbell | 260—333 |
| 2,495,305 | 1/1950 | Wyler | 260—333 |
| 3,644,404 | 2/1972 | Throckmorton | 260—327 |
| 3,632,839 | 1/1972 | Young, et al. | 260—45.75 |
| 3,577,346 | 5/1971 | McKeown | 260—45.75 |
| 3,389,157 | 6/1968 | Ramsden | 260—45.75 |
| 3,209,013 | 9/1965 | Hechenbleikner et al. | 260—45.8 |

DONALD E. CZAJA, Primary Examiner

E. C. RZUCIDLO, Assistant Examiner

U.S. Cl. X.R.

260—45.75 K, 45.8 R, 45.8 A